Dec. 29, 1931.　　　W. BALL　　　1,838,209
CALCULATING MACHINE
Filed Dec. 30, 1927　　6 Sheets-Sheet 1

Inventor:
William Ball
by [signature]
Attorney.

Dec. 29, 1931. W. BALL 1,838,209
CALCULATING MACHINE
Filed Dec. 30, 1927 6 Sheets-Sheet 2

Fig. 2.

Inventor:
William Ball

Dec. 29, 1931.  W. BALL  1,838,209

CALCULATING MACHINE

Filed Dec. 30, 1927  6 Sheets-Sheet 4

Inventor:
William Ball
By [signature]
Attorney.

Dec. 29, 1931.                    W. BALL                    1,838,209
                        CALCULATING MACHINE
                    Filed Dec. 30, 1927      6 Sheets-Sheet 5

Inventor:
William Ball
By
Attorney

Dec. 29, 1931.  W. BALL  1,838,209
CALCULATING MACHINE
Filed Dec. 30, 1927  6 Sheets-Sheet 6

Inventor:
William Ball
By 
Attorney

Patented Dec. 29, 1931

1,838,209

UNITED STATES PATENT OFFICE

WILLIAM BALL, OF WALLINGTON, ENGLAND

CALCULATING MACHINE

Application filed December 30, 1927, Serial No. 243,660, and in Great Britain December 31, 1926.

This invention relates to calculating machines furnished with a series of number wheels which are operated through mechanism the extent of movement of which is controlled by hand-actuated keys and in which both addition and subtraction can be performed.

The chief object of the invention is to improve and simplify the construction of such machines, decrease the number of operations required to actuate the machines and to increase their efficiency.

Another object of the present invention is to provide mechanism for operating a number wheel and a row of keys controlling such wheel which are all mounted and assembled as a complete unit and can mostly be made from stampings or the like.

Another object of the invention is to provide mechanism whereby direct subtraction can be obtained as distinguished from the known method of adding a number equivalent to the capacity of the machine less the actual number to be subtracted.

Another object of the invention is to provide mechanism whereby a transfer from one wheel to another can be effected directly both in the operations of addition and subtraction.

According to the present invention there is employed for operating each number wheel a normally movable member, the extent of movement of which is determined by the operation of one of a series of keys and a normally stationary member which is automatically released for the transfer of an integer from one wheel to another either in the process of addition or subtraction, to vary the movement of the operating member as determined by the actuated key.

The normally stationary member may be retained by a catch which automatically releases the stationary member when an integer is to be transferred. Two catches may be employed for each normally stationary member, one holding said member against movement.

The keys in the key-board are preferably so constructed and arranged that depression of one key in a row releases any key depressed in that row, whereby a ready means of rectifying a mistake is provided without necessitating a clearance of the key-board and a recommencement.

Other novel features will be hereinafter described and specified in the appended claims.

In the drawings:—

Figure 18 is another detail view. The keys (see Figures 1, 2, 3 and 4) each comprise flat plungers $a$ having operating heads $a^1$, said plungers being mounted in slots in the sections of the keyboard $a^2$ with their lower ends passing through guiding strips $a^3$, spaced apart by standards $a^4$. The keys are provided on one side with projections $a^5$ the upper edge of which forms an abutment to take against the underside of the keyboard $a^2$ to limit the upward movement of the keys. On the opposite side of the keys is a similar projection the upper edge of which may also form an abutment. This projection is, however, provided with upper and lower slots $a^6$ and $a^7$ separated by a nose $a^8$. Between the bottom of the projections on the key and the guide plate $a^3$ is arranged a compression spring $a^9$.

Figures 4, 5:
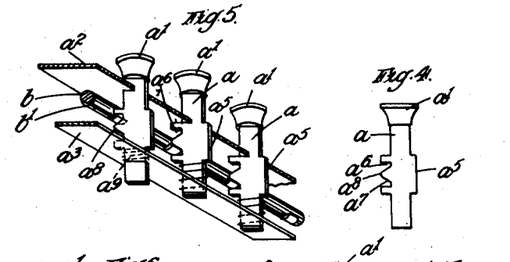
Figure 4 is an elevation of a single key.
Figures 5, 6 and 7 are fragmentary perspective views showing means for retaining the keys in the depressed condition and releasing the same.
Figures 6, 7:
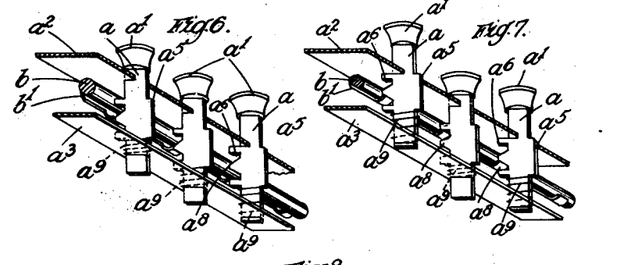
Figure 8:
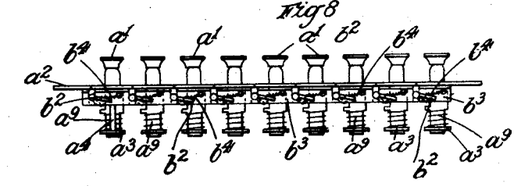
Figure 8 is an end view of the key-board, looking from the rear of the same.

In Figure 5 the first key of the row is shown depressed, while the other keys are in their normal position. In order to retain the keys in the depressed condition and so that the depression of any one key in a given row of keys causes a depressed key to be released, there is employed a rod $b$ (see Figures 5 to 8) having a plurality of arms or claws $b^1$ and controlled by a spring $b^4$ attached to an arm $b^2$ and to a plate $b^3$. The arms $b^1$ are each adapted to co-act with one key and to take into either the slot $a^6$ or the slot $a^7$ according to whether the key is in the depressed or raised position. By this means also, the depressing of one key releases any other key which is depressed in this row. The first key is shown depressed, (in Figs. 5 and 6) and the arm $b^1$ is in the slot $a^6$, the other arms $b^1$ lying in the slots $a^7$ of the other keys. When a second key is depressed, the nose $a^8$ thereof acts on the corresponding arm $b^1$, depressing it, and hence all the arms $b^1$ and rod $b$ are rocked. In the case of the keys which are not depressed, the arms $b^1$ rock freely but in the case of a depressed key the arm $b^1$ slides along the upper surface of the nose $a^8$ as shown in Figure 6, and moves past the end of the nose, whereupon any depressed key will be returned to the normal position by its spring $a^9$. When a key has been depressed, it assumes the position shown in Figure 7, whereupon the corresponding arm $b^1$ snaps into the slot $a^6$ and retains it in its depressed position.

Should therefore, the wrong integer be indexed it will only be necessary to depress the correct key or a release key $a^{11}$ hereafter referred to, whereupon the mistake will be rectified.

Figure 1:
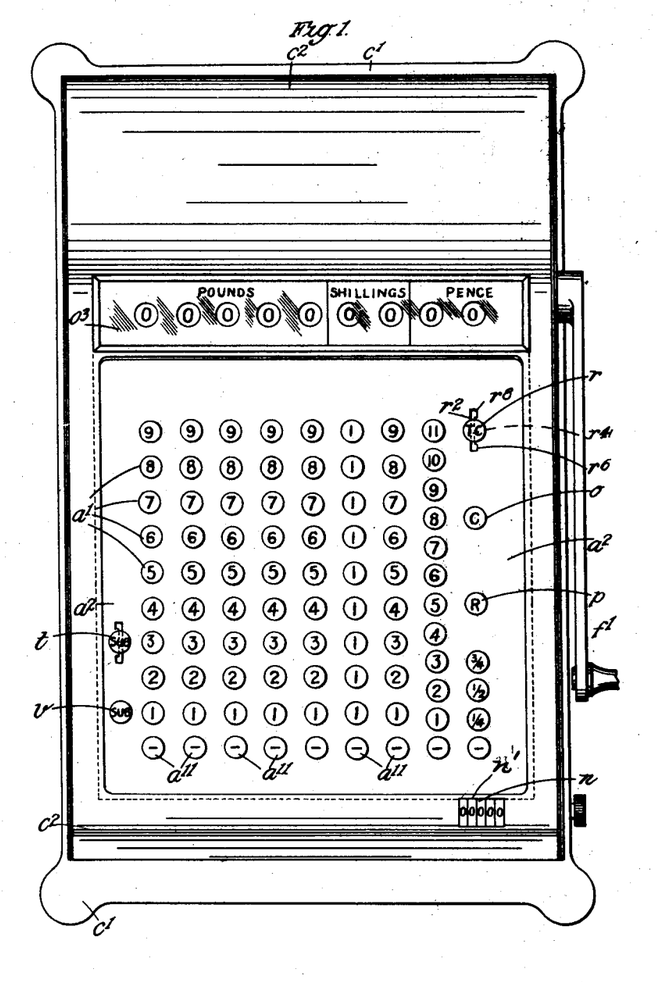
Figure 1 is a plan of a complete machine embodying the present invention but without the means for printing the items.
Figure 2:
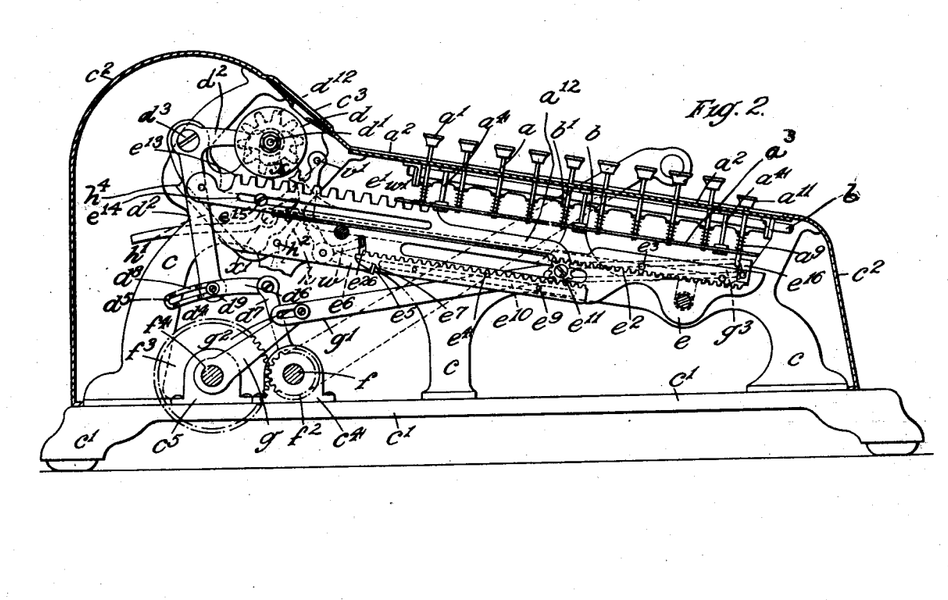
Figure 2 is a longitudinal section through the machine showing one row of keys and associated parts forming a unit.
Figure 3:
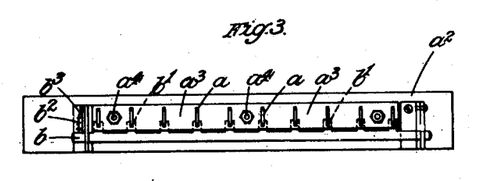
Figure 3 is an underside view of the row of keys of one section of the key-board.

The keyboard is mounted on side standards $c$ screwed to the base $c^1$ and the whole machine is provided with a cover $c^2$ having an aperture through which the keyboard projects and also having a glazed aperture $c^3$ through which the number wheels $d$ can be viewed (see Figures 1 and 2).

Figure 13:
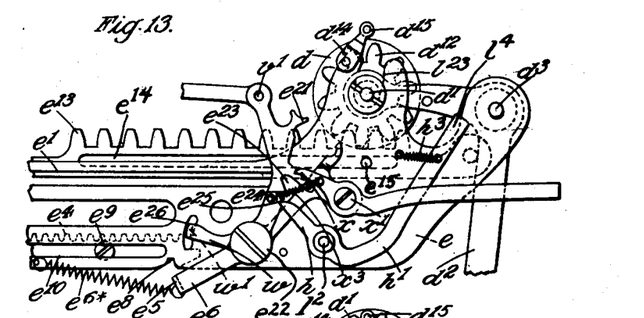
Figure 13 is a view showing the disposition of the levers when in the normal subtracting position.
Figure 14:
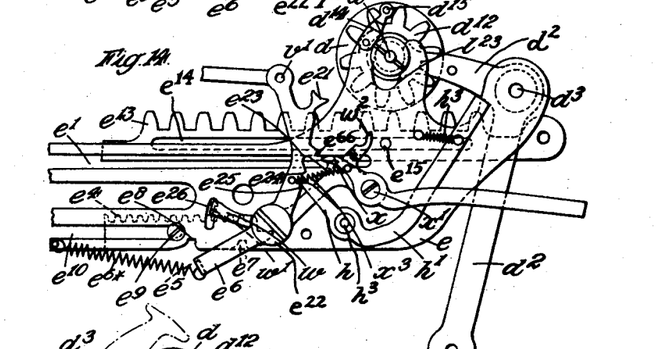
Figure 14 is a view showing the disposition of the levers when transfer is taking place during subtraction.

Stretchers or carrier frames $e$, one for each row of keys, are arranged across the machine. Each stretcher is provided with a slot $e^1$ in which slides a pin or projection $e^3$ (Fig. 2) outstanding from the upper or normally movable rack $e^2$. The projections $e^3$ prevent side play of the racks $e^2$ and they also constitute stops to arrest said racks in zero position. The lower portion of the stretcher $e$ carries the normally stationary rack $e^4$. This rack is held by the upturned end $e^5$ of a lever $e^6$ taking into the registering slots $e^7$ and $e^8$ in the lower rack and stretcher respectively (see Fig. 14). The lower rack $e^4$ is also provided with two projecting headed pins $e^9$ which slide in elongated slots $e^{10}$ in the stretcher so that the lower rack $e^4$ can be moved to occupy the position shown in Figure 12 by reason of the pins sliding in the slots. Between the upper and lower racks $e^2$ and $e^4$ respectively runs a pinion $e^{11}$ (see Fig. 2) connected by a link $e^{12}$ (see Fig. 9) to a wheel operating rack $e^{13}$ which is slotted as at $e^{14}$ to slide on pins $e^{15}$ (see Figs. 2 and 13) on the stretcher. The upper rack $e^2$ is provided at its front end with a fibre or other abutment $e^{16}$ (see Fig. 2) which is adapted to engage with the lower end of any depressed key in its corresponding row, and is shown in Fig. 2 as contacting with the release key $a^{11}$ of the row; this for the reason that at the completion of an operating stroke, when all parts are set to normal, the release keys of all units (each unit, that is to say, comprising a stretcher and its associated racks, keys and transfer device) are automatically depressed to lock the top racks, so that if no amount is set up or indexed in a particular unit, nothing will be run into or registered in the corresponding number wheel. Hence, when a rack of any unit is in its zero position, its abutment $a^{16}$ will be engaged by the corresponding release key until a number or indexing key of the same unit is depressed, whereupon the release key is raised and releases the rack. By reason of the abutment $e^{16}$ taking against a depressed key the movement of the upper rack is limited to an amount corresponding to value of the key depressed and hence the movement of the operating rack $e^{13}$ is limited correspondingly.

Disposed on the base $c^1$ of the machine are two bearings $c^4$ between which is carried the main operating shaft $f$. This shaft $f$ projects through the side of the casing $c^2$ and is provided with an operating handle $f^1$. The shaft $f$ is provided with a gear wheel $f^2$ which engages with a gear wheel $f^3$ on a shaft $f^4$ carried in brackets $c^5$ secured to the machine. Secured to the shaft $f^4$ are arms $g$, one for each row of keys, and to the upper end of each arm $g$ is pivoted a link $g^1$. The link $g^1$ is provided at its rear end with a slot $g^2$ so that there is a certain amount of lost motion in this transmission. The link $g^1$ is provided with an elongated slot $g^3$ (see Fig. 2) in which is arranged the pin $e^{17}$ of the previously-mentioned pinion $e^{11}$ (see Fig. 9).

Figure 9:
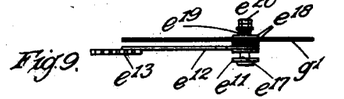
Figures 9 and 10 are detail views.

This pin is held friction tight in the slot $g^3$ by means of fibre washers $e^{18}$ arranged one on each side of the link $g^1$, and pressed against the link $g^1$ by a spring $e^{19}$ and regulating nut $e^{20}$. When the handle $f^1$ is operated the arms $g$ are moved in an anticlockwise direction and, after taking up the lost motion due to the slot $g^2$, pull the pinion $e^{11}$ along the lower rack $e^4$ which is held stationary, until the abutment $e^{16}$ on the rack $e^2$ comes into contact with a depressed key, whereupon the pinion is held against further movement, and continued movement of the arms $g$ causes the link $g^1$ to slide past the fibre washers $e^{18}$. Then, when the handle is allowed to return, under spring or other pressure, the arms $g$ move in a clockwise direction and return the pinions and upper racks to their forward position and continued rotation of the arms $g$ will cause the slots $g^3$ to slide past the fibre washers and return the links and the parts associated therewith to their normal position. A dashpot may be arranged at any suitable part of the machine to delay the return of the handle.

During the process of addition the pinions $d^{12}$ on the number wheels $d$ are brought into contact with the operating racks $e^{13}$ at the time when the handle $f^1$ starts to return to its normal position so that said operating racks $e^{13}$ in their return run revolve the wheels to the required extent. The said wheels $d$ are each rotatable on a shaft $d^1$ carried by a bell crank $d^2$, one bell crank being provided for each section of the machine. These bell cranks or levers $d^2$ are pivoted on pins $d^3$ projecting from the stretchers $e$. At the lower end of each of these levers $d^2$ is arranged a pivot pin $d^4$ which projects through an elongated slot $d^5$ in one end of a link $d^6$, the other end of which is pivoted to an arm $d^7$ also secured to the main operating shaft $f$, of the machine.

Figure 10:
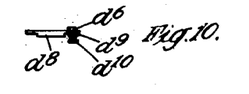

The link $d^6$ has an enlarged portion $d^8$ (see Fig. 10) forming a friction grip or lock between the parts $d^2$ and $d^6$. Thus, when the handle $f^1$ is depressed, the arm $d^7$ is pulled forward taking with it the link $d^6$. The pins $d^4$ are provided with lipped washers $d^9$ in order to enable them to slide in the slots against the action of the springs $d^{10}$. As the link $d^6$ moves forward it tends due to the friction on the pin $d^4$, to draw the lower arm of the bell crank $d^2$ forward, thus keeping the pinion $d^{12}$ on the number wheel $d$ out of mesh with the operating rack $e^{13}$. When, however, the handle returns, the tendency of the link $d^6$ is to push the bell crank backwardly and this is accentuated by reason of the friction on the pin $d^4$ with the result that the lower arm is pushed backwards and pinions $d^{12}$ are brought down into engagement with the operating racks $e^{13}$ which thus rotate the number wheels to the required extent.

The handle $f^1$ may be arranged at any suitable angle and the gear wheels $f^2$, $f^3$, may be of any suitable ratio to enable the handle to perform the length of stroke necessary.

The spindle $d^1$ of the number wheel $d$ is adapted to move vertically in a slot $l^{23}$ in the stretchers $e$. This slot may be so formed as to prevent the spindle $d^1$ being lifted out of the slot by being of less size at its mouth than at the part accommodating the spindle $d^1$. In order to prevent the number wheels $d$ rotating when they are out of engagement with the operating racks $e^{13}$, a peg $d^{15}$ (see Figs. 11, 12 and 13) may be provided for each wheel outstanding from a projection $d^{14}$ on the stretcher $e$ and adapted to engage in the teeth of the corresponding pinion $d^{12}$, as soon as the latter commences to rise out of the rack $e^{13}$.

Figure 11:
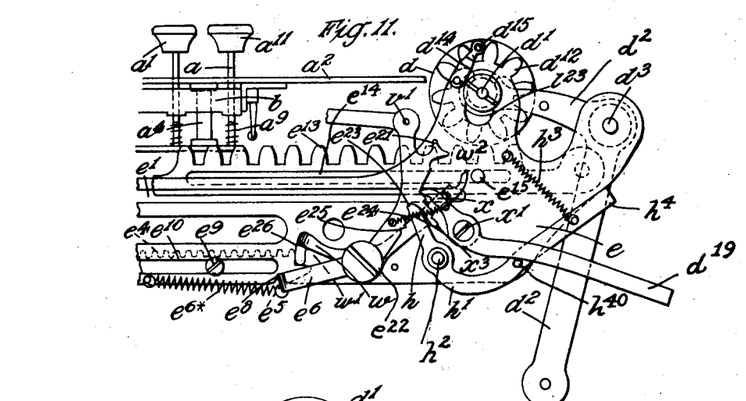
Figure 11 is a fragmentary view of one section of the key-board showing the various levers and catches for effecting the transfer from one column to the next, in the normal adding position.
Figures 11A, 12:
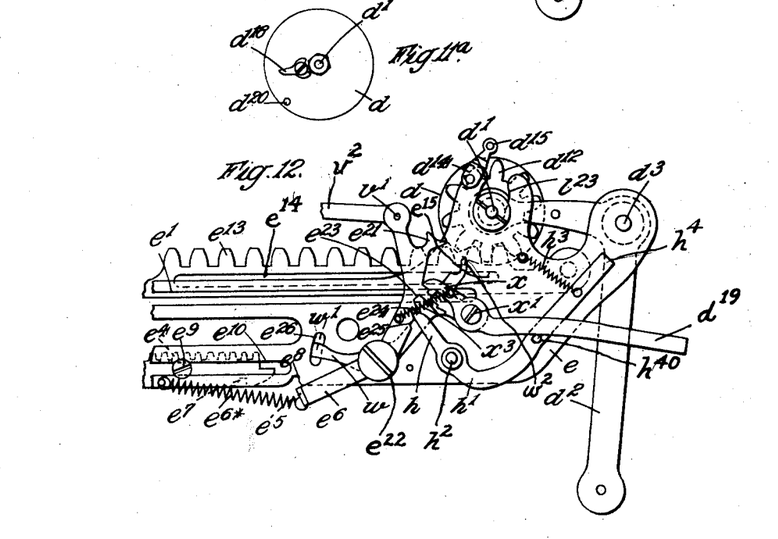
Figure 11a is an elevation of a number wheel showing the transferring projections thereon.
Figure 12 is a similar view to Figure 11 showing the levers operated to add an item to the section, this item having been transferred from the section of next lower denomination.

Describing now the method of transferring from one column to the next during the process of addition, and referring more particularly to Figures 11, 11a and 12, each number wheel $d$ is provided with a projecting pawl $d^{18}$ which, when in a position such that the number wheel pinion is in mesh with the teeth of rack $e^{13}$ and a total is showing through the glazed panel $c^3$, rests against the upper end $e^{21}$ of the lever $e^6$ which is pivoted at $e^{22}$ to the stretcher $e$ pertaining to the unit of next higher denomination as shown in Figure 11. Then when a further impulse is given to the number wheel under consideration, the pawl $d^{18}$ moves past the end $e^{21}$ of the lever $e^6$ and in so doing moves the lever upwardly sufficiently to cause the recess $e^{23}$ in the lever to move clear of the nose $h$ of the pawl $h^1$ which is pivoted at $h^2$ to the stretcher, and said nose then drops into the notch $e^{24}$ where it holds the lever $e^6$ in position (see Fig. 12), due to pawl $h^1$ being controlled by a spring $h^3$. Thus, the upturned end $e^5$ of the lever $e^6$ is retained out of the slots $e^7$ and $e^8$. The pawl $d^{18}$ of one number wheel is arranged to operate on the lever $e^6$ of the next denomination. This actuation of the lever $e^6$ must take place on the return movement of the operating racks. Now consider the case of a row in which the lever $e^6$ has been operated: the upper rack $e^2$ will run back until it resumes its normal position and then, on continued movement of the link $g^1$, the rack $e^2$ will become fixed and the normally fixed rack $e^4$ will be moved with the result that the pin $e^9$ will slide in the slot $e^{10}$ until the rack $e^4$ takes up the position shown in Figure 12. Alternatively the two racks may move as a unit. The length of the slots $e^{10}$ on either side of the mid point is made to correspond to a distance equal to two teeth of the racks and thus, due to the lower rack $e^4$ having slid along the stretcher, the pinion $e^{11}$ will have moved forward another tooth. This extra movement of the pinion will be communicated through the operating rack $e^{13}$ to the number wheel and so a unit will be added to the number wheel every time the tooth of the preceding wheel operates the lever $e^6$, i. e. once at every complete revolution of the wheel assuming that the tooth is provided on the wheel for that purpose.

At the end of an operating stroke, a bar $d^{19}$ that forms part of pawl $x$ comes into engagement with a pin $h^{10}$ (Figs. 11 and 12) on the extended arm $h^4$ of the pawl $h^1$, thus raising the pawl $h$ and allowing it to snap past a projection into the recess or notch $e^{23}$. This leaves the upturned end $e^5$ of the lever $e^6$ free to return into the slots $e^7$ and $e^8$ when they come into register.

When the handle is moved forward to add the next item, the number wheel pinions are raised out of mesh with the operating racks $e^{13}$. The bottom racks then move back, and due to the slight amount of friction between the racks $e^2$ and $e^4$ and the stretcher, the racks and pinions will move as a unit until the bottom rack $e^4$ assumes its normal position when the upturned end $e^5$ of the lever $e^6$ snaps into the registering slots $e^7$, $e^8$ and locks the bottom rack in position. If no keys are depressed in the column, the top rack will become the fixed rack and the bottom rack will move until the slots $e^7$ and $e^8$ register when as above described the bottom rack will become locked. While the racks and pinions are moving as a unit, the pinion $e^{11}$ moves two teeth for two teeth of the upper rack and so the operating rack is enabled to make up for the extra tooth it moved forward without affecting the working of the machine. The lost motion occasioned by the slot $g^2$ in the link $g^1$ enables the number wheels $d$ to be raised clear of the operating racks before the same are run back and also enables the lever $e^6$ to be released before the racks commence to move to add the next item.

Figure 15:
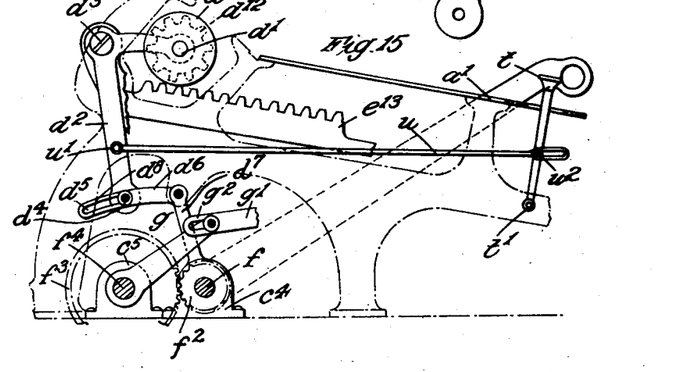
Figure 15 is a fragmentary view of the subtracting key and its associated mechanism.

As above described, during addition the number wheel pinions are held out of mesh with the operating racks $e^{13}$ while the racks are setting themselves to the keys depressed and are held in mesh with the operating racks while the racks are being returned to their normal position. Now, for subtraction, it is merely necessary to reverse this order and keep the number wheels in mesh while the racks are setting themselves and keep them out of mesh while the racks are being returned. Suitable means are provided for obtaining this reversal of movement either automatically or manually but preferably a key $t$ is pivoted at $t^1$ (see Fig. 15) and is adapted to slide in a slot in the keyboard. This slot is provided on one side with three detents into which the key $t$ can be placed, (see Fig. 1) the central position being a neutral position. The key $t$ is connected to the bell-crank lever $d^2$ by a link $u$ which is pivoted to the bell crank lever $d^2$ at $u^1$ and slidably connected to the key $t$ at $u^2$ and is held friction-tight on the key $t$. When the key $t$ is pressed towards the number wheels, the link $u$ will press the lower limb of the lever $d^2$ rearwardly and will bring the number wheels into mesh with the operating racks $e^{13}$. The number which it is desired to subtract may be set up in the keyboard, and by operating the handle $f^1$ the racks will revolve the number wheels in the reverse direction to the desired extent to subtract from the total the number set up in the keyboard. Before the handle $f^1$ is allowed to return, the key $t$ is pressed backward to its furthest position when the number wheels $d$ will be held out of mesh while the racks are returning to their normal position.

Describing now the method of obtaining the transfer during subtraction: it will be appreciated that while in addition the transfer is effected at 9, in subtraction the transfer must be effected at 0. For this purpose a pin $d^{20}$ on the number wheel $d$ which is used for subtraction is displaced with respect to the pawl $d^{18}$ used for addition a space equal to the angular rotation equivalent to one digit on a wheel (see Fig. 11a).

In subtraction a key $v$ (see Fig. 1) is operated which may be connected by a link $v^2$ with the key $t$, this link $v^2$ being connected with the lever $e^6$ as at $v^1$ (see Fig. 12). The key $v$ is adapted to pull the lever $e^6$ forward until it assumes the position shown in Figure 13, i. e., with the bent end or catch $e^5$ well clear of the slots $e^7$ and $e^8$ and with the nose $h$ of the pawl arm $h^1$ in a second notch $e^{25}$ in the lever $e^6$. Also pivoted at $e^{22}$ is a lever $w$ which extends on either side of the pivot, being provided at its forward end with a turned up catch $w^1$ which takes through a slot $e^{26}$ in the stretcher $e$, the slot $e^{26}$ being of such length that when the catch $w^1$ is in its uppermost position it is clear of the rack $e^4$ but when in its lowermost position it slides down to the bottom of the slot $e^{26}$ and there forms an abutment against which the rearward end of the rack $e^4$ hits. The lever $w$ is also provided with a pawl $x$ the nose of which is adapted to engage teeth $e^{66}$ on an arm on the lever $e^6$. The pawl $x$ is pivoted at $x^1$ to the lever $w$ and extends rearwardly. The pawl $x$ is connected by a spring $x^3$ with the lever $e^6$. When the key $v$ is operated to pull the lever $e^6$ forward, the lever $w$ is also pulled forward by the spring $x^3$ so that the parts assume the position shown in Figure 13. The part $e^{21}$ of the lever $e^6$ is thus moved into such a position as not to be engaged by the arm $d^{18}$ while the extreme point $w^2$ of the lever $w$ is engaged by a pin $d^{20}$ on the number wheel. When transfer during subtraction is to take place, the pin $d^{20}$ engages the end $w^4$ of the lever $w$ and moves it into the position shown in Figure 14. Here, the catch $w^1$ has been lifted clear of the rear end of the rack due to the rearward movement of the lever $w$. Then when the racks are run back, the rack $e^4$ will slide a distance equal to two teeth backwardly whereupon, due to the doubling motion, a further unit will be subtracted from the number wheels. On the return run, the racks will be reset as above referred to in connection with the addition transfer, the arms $h^1$ and $w$ being given an impulse at the end of each stroke to release the pawls $h$ and $x$ from the teeth and so return the levers to the position shown in Figure 11 under the action of the spring $e^{6x}$. It does not matter even if the bottom rack moves past its normal position so that it takes up the addition transfer position shown in Figure 12 as in this case this extra movement will be taken up at the next addition as referred to above in connection with the addition transfer, the catch $e^5$ being ready to snap into the slots $e^7$ and $e^8$ when they register.

Figure 16:
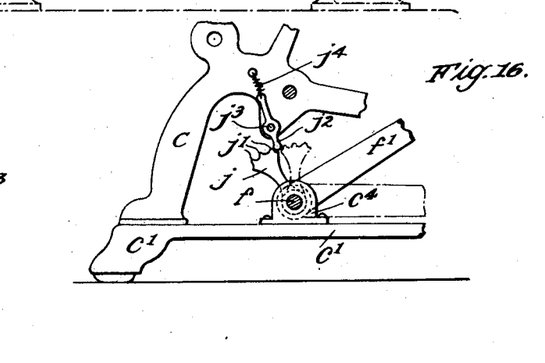
Figure 16 is a detail view.
Figure 17:
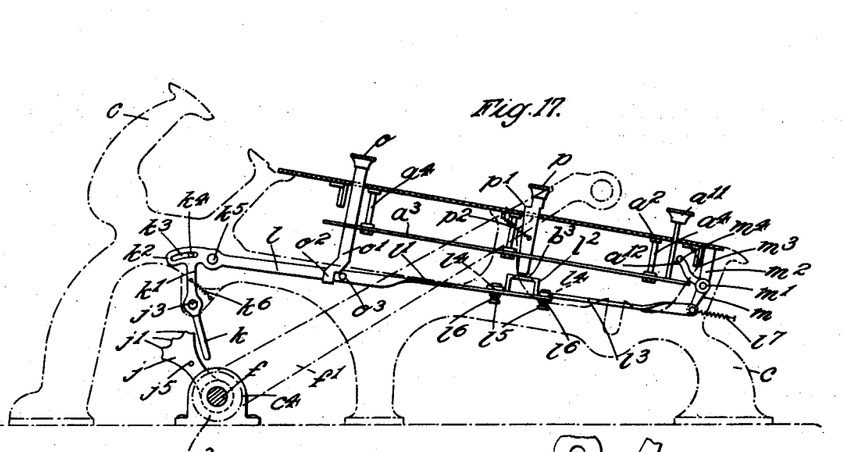
Figure 17 shows the mechanism for clearing the keyboard.

Attached rigidly to the shaft $f$ is a member $j$ (see Figures 16 and 17). This member $j$ is provided with three or other suitable number of small projections $j^1$ adapted to engage with a small arm $j^2$ pivoted at $j^3$ to one of the standards $c$. This arm is controlled by the spring $j^4$ so that it snaps over the projections $j^1$ and thus enables the operator to be sure that the handle $f^1$ has been fully depressed by feeling the three small snaps as the arm $j^2$ snaps over the projections $j^1$. Also arranged loosely on the pivot pin $j^3$ is a lever one arm $k$ of which is adapted to be engaged by a pin $j^5$ on the member $j$ to rock the lever every time the handle $f^1$ is operated. The other arm $k^1$ of this lever extends upwardly and is provided with an enlarged upper end $k^2$ having an arcuate slot $k^3$ therein which works about a guide pin $k^4$, disposed on the side standard. Pivoted at $k^5$ to the enlarged end $k^2$ is a sliding bar $l$ which runs down the right hand side of the key board under special keys marked T. C., C. and R. (see Figure 1). The sliding bar $l$ is provided with a flexible joint under the repeat key marked R and for this purpose it may be twisted near its end as at $l^1$ and have slidably mounted thereon a further bar $l^3$ bent up on itself as at $l^2$ as to form a portion of inverted U section. This bar $l^3$ extends forwardly. The part $l^2$ has elongated slots $l^4$ through which, and similar slots in the bar $l$ are passed bolts $l^5$, fibre washers being arranged on top and below the parts and a spring $l^6$ being provided on the bolts $l^5$ in a similar manner to that described in connection with the pinion $e^{11}$. To the forward end of the bar $l^3$ is pivoted a bell crank lever $m$ which is pivoted at $m^1$ to brackets $m^2$ on the underside of the key board. The other arm $m^3$ of the lever $m$ is provided with a bar $m^4$ which runs along the front of the keyboard. A further bell crank lever corresponding to the bell crank lever $m$ may, if desired, be arranged at the further end of the machine and if found desirable to prevent twisting of the bar $m^4$ the operating mechanism may be duplicated at the further end of the machine.

The front key $a^{11}$ of each of the rows of keys is hereinafter referred to as the "stop key" and does not correspond to any figure. Each of these keys is provided with a projecting pin $a^{12}$ adapted to be engaged by the bar $m^4$. Thus every time the bar $m^4$ moves downwardly, it will depress all the stop keys $a^{11}$ and so clear the keyboard.

At each movement of the sector shaped member $j$ the pin $j^5$ engages the arm $k$ and rocks the upper end of the arm $k^1$ and, therefore, causes the sliding bar $l$ to move backwards and forwards. The arm $k^1$ is controlled by a spring $k^6$ so that the arm $k$ snaps forwardly and backwardly over the pin $j^5$ and the bar $l^3$ is placed under tension by the spring $l^7$. When the handle $f^1$ is moved downwardly, the stop $j^5$ moves the arm $k$ forwardly, thus moving the arm $k^1$ rearwardly, and this movement is communicated along the bars $l$, $l^3$ to the bell crank lever $m$, the bar $m^4$ thus being raised. At a certain period, the arm $k$ snaps past the stop $j^5$. Then on the return movement of the handle the arm $k^1$ is forced forwardly which causes the bar $m^4$ to be depressed. Just prior to the snapping of the arm $k$ past the stop $j^5$, the bar $m^4$ has depressed all the stop keys sufficiently to cause the arms $b^1$ of the release bar $b$ to snap into the slots $a^6$ therein. This will clear the key board. Thus at every operation of the handle $f^1$ the number which is set up in the key board by depressing the proper keys is added to the number wheels as described above, transfer taking place if necessary, and the key board is automatically cleared to receive the next item.

Five teeth $d^{12}$ are provided on the ten-shillings wheel so that in one complete revolution the transfer will take place five times (i. e. 100 shillings = £5 = 5 transfers). Also, although all the keys in the row corresponding to the tens of shillings are numbered 1, yet depression of any one of these keys will only allow the upper rack to move two teeth to give a single tooth movement of the operating rack and hence a single tooth movement to the wheel $d$. This may be accomplished by providing an outstanding stop on the stretcher to limit the movement of the rack. By having a series of keys for the tens of shillings the operator's work is materially lessened as the key for the tens of shillings at the side of the unit-shillings key can be depressed at the same time as the unit-shillings key.

Three teeth for transfer will be provided on the farthings wheel as one complete revolution thereof will correspond to three pence.

A revolutions counter $n$ may be provided and be visible through an aperture $n^1$ in the cover $c^2$. The counter may be connected by a suitable link with the sliding bar $l$ so that it is given an impulse at every operation of the bar $l$.

In some cases it may be desired to clear the key board apart from the automatic clearing provided when the handle $f^1$ is operated. To this end a key $o$ may be provided which passes through a slot in the keyboard (see Fig. 17). This key is inclined rearwardly as at $o^1$ on the underside of the keyboard and is provided at its extreme end with a depending portion $o^2$. The inclined portion is adapted to engage with a stop $o^3$ on the bar $l$ so that when the key $o$ is depressed the bar is moved forwardly and thus brings the bar $m^4$ down as to depress the stop keys and hence clear the key board. The downwardly projecting portion $o^2$ of the key does not normally bear on the stop $o^3$ but is displaced a short distance therefrom in order to allow the normal movement of the pin $o^3$ to take place when the handle $f^1$ of the machine is operated.

It may be desired to add the same item a number of times and in order to avoid the necessity of repeating a key action, means may be provided whereby the automatic clearing of the keyboard due to the operation of the handle $f^1$ may be suspended. For this purpose, a key $p$ controlled by a spring $p^2$ is provided and is furnished with a shoulder $p^1$ which when the key is depressed snaps under a catch and retains the key in the depressed position. The end of the key $p$ when depressed takes into a slot $p^3$ in the bent up portion $l^2$ of the bar $l^3$. Then any movement of the bar $l$ due to the operation of the handle will be taken up on the sliding joint between the bars $l$, $l^3$ by reason of the bolts sliding in the slots $l^4$. Therefore, since the bar $m^4$ is not operated at each operation of the handle the key board will not be cleared and the same item can be added any number of times by operating the handle the required number of times.

Figure 18:
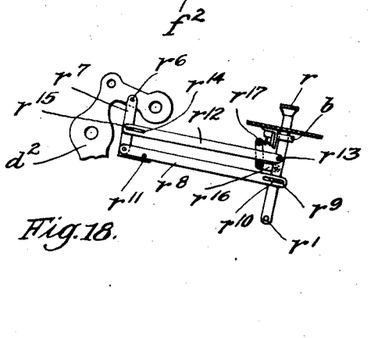

In Figure 18 is illustrated mechanism for clearing the number wheels and zeroizing the machine. Such mechanism comprises a key $r$ pivoted at $r^1$ to some part of the machine, and working in a slot $r^2$ (Fig. 1) in the key board, this slot being provided with three lateral recesses $r^3$, $r^4$, $r^5$, respectively into which the key can be placed. Pivoted at $r^6$ to the bell crank arm $d^2$ carrying the number wheel is an L-shaped link $r^7$ to which is pivoted a link $r^8$, the other end of which is provided with an elongated slot $r^9$ sliding on a pin $r^{10}$ on the key $r$. The link $r^8$ is provided with a pin $r^{11}$ against which the base of the L-shaped link $r^7$ abuts. Also connecting the key $r$ and the link $r^7$ is a link $r^{12}$ which is pivoted at one end to the key $r$ at $r^{13}$ and is provided at the other end with an elongated slot $r^{14}$ sliding on a pin $r^{15}$ on the link $r^7$. The normal movement of the number wheels $d$ will not be interfered with as they can rise and fall independently of the key $r$ due to the elongated slots $r^9$ and $r^{14}$ sliding on the pins $r^{10}$ and $r^{15}$.

In order to zeroize the machine, the top key of each row of keys should be depressed so as to allow the top racks a full travel, if necessary, and then the key $r$ should be placed in the recess $r^5$. This will, through the medium of the links $r^7$, $r^8$ and $r^{12}$, cause the number wheels to be brought into engagement with the operating racks $e^{13}$. Then the handle $f^1$ is operated, and causes the top racks $e^4$ and the operating racks $e^{13}$ to run backwards, revolving the wheels $d$ in the reverse direction until the zero mark is showing behind the glazed aperture $c^3$ in the casing $c^2$. When the zero shows, the pawl $d^{18}$ will come into contact with the upper end $e^{21}$ of the lever $e^6$, and this pawl being unable to slip past the lever $e^6$, the links $g^1$ will slip on the pinion $e^{11}$. Before the handle $f^1$ is returned to its normal position, the key $r$ should be moved into the recess $r^3$ to cause the slot $r^{14}$ in the link $r^{12}$ to move to its fullest extent along the pin $r^{15}$ so as to prevent the number wheel being brought down into mesh with the operating racks. The handle is then allowed to return whereupon the key board will be cleared. Alternatively a link $r^{16}$ may be connected to the key $r$ and be adapted to rock a bar $r^{17}$ when the key $r$ is moved to the position which in turn rocks the rods $b$, thereby releasing the stop keys $a^{11}$. Then when the handle $f^1$ is operated, the racks $e^4$ will run backwardly and will clear the wheels as described above.

Although this invention has been described in detail many modifications thereof may be effected without departing from the spirit of the invention.

The invention has been described as embodied in a machine for sterling currency, but it can be equally well embodied in a machine for currencies using the decimal system by simply omitting the sections apportioned as herein described to pence and shillings and inserting or using units to the full capacity of the machine and identical with the units herein apportioned to pounds.

Having thus described my invention what I claim is:—

1. In a calculating machine, the combination of number wheels, operating mechanism for each wheel comprising a normally movable rack, a normally stationary rack and a pinion gearing with both racks, yielding actuating means for imparting a translation movement to the pinion, keys for determining the extent of movement of one rack, a catch for the normally stationary rack, means whereby the catch is released by movement of the number wheel so that the movable rack may be moved by the pinion to rotate the particular number wheel and transfer an integer from one wheel to another, and means for supporting said normally stationary rack for a predetermined amount of movement when released.

2. In a calculating machine, the combination of number wheels, operating mechanism for said wheels comprising a normally stationary rack, a normally movable rack and a pinion gearing with both racks, mechanism for operating the pinion, hand operated keys for determining the extent of normal movement of the movable rack, a catch normally holding the stationary rack against movement in either direction, a second catch holding the normally stationary rack against movement in one direction, means controlled by the movement of the number wheel for releasing the first mentioned catch when an integer is to be transferred during addition, means whereby the said catch is held out of engagement with the rack during subtraction, means whereby the second catch is brought into engagement with the normally stationary rack during subtraction, and means whereby the second catch is moved out of engagement with the said rack when in the operation of subtraction an integer is to be transferred.

3. In a calculating machine, the combination of number wheels, operating mechanism for said wheels comprising a normally stationary rack, a normally movable rack and a pinion gearing with both racks, mechanism for operating the pinion to give a to and fro movement to the normally movable rack, hand-operated keys for determining the extent of movement of the movable rack, a catch member for holding the stationary rack against movement in either direction, a second catch member for holding the said stationary rack against movement in one direction only, means on a number wheel of one denomination adapted to release the first-mentioned catch during the operation of addition, and means on the said number wheel for releasing the second catch during the operation of subtraction.

4. In a calculating machine, the combination of number wheels, operating mechanism for said wheels comprising a normally movable rack, a normally stationary rack and a pinion gearing with both racks, means for actuating the pinion, catches for the normally stationary rack, means for releasing the catches so that the stationary rack can increase the normal movement of the movable rack to effect transfers, hand-operated keys for determining the normal movement of the movable rack, and means for automatically clearing the keyboard at the end of such complete operation.

5. In a calculating machine, the combination of number wheels operating mechanism for said wheels comprising a normally movable rack, a normally stationary rack and a pinion gearing with both racks, means for actuating the pinion, indexing keys acting on depression to determine the normal movement of the movable rack, means for operating the stationary rack to increase the movements of a number wheel as determined by a depressed key, and thereby effect transfers and means for zeroizing a total registered on said wheels and for clearing the keyboard.

6. In a calculating machine, a set of accumulator wheels; a driving mechanism individual to each wheel; a set of denominational banks of keys, one for each driving mechanism, for determining the extent of its active movement; a release key for each bank of keys to release any depressed key therein, said release key constituting the zero stop key; a general operator common to all the driving mechanisms; a bar associated with all the release keys to actuate them simultaneously; and a connection between said bar and the general operator for automatically actuating the former during each complete movement of the latter.

7. In a calculating machine which comprises accumulator wheels, devices for running numbers thereinto, a flexible denominational keyboard for setting up the numbers on said devices, and a general operator for all said devices: a set of release keys, one for each denomination of the keyboard, each of said keys constituting the zero stop key; a bar common to all the release keys to actuate them simultaneously; bell crank supporting means for said bar; and a connection between the bell crank means and the general operator for automatically rocking the former in a direction to depress the release keys during each complete operation of said general operator.

8. In a calculating machine which comprises accumulator wheels, devices for running numbers therein, a flexible denominational keyboard for setting up the numbers on said devices, and a general operator for all said devices: a set of release keys, one for each denomination of the keyboard, each of said keys constituting the zero stop key; a bar common to all the release keys to depress them simultaneously; a connection between said bar and the general operator for automatically actuating the former during each complete movement of the latter; and a special key loosely related to said connection for operating the same at will independently of the general operator.

9. A calculating machine, according to claim 8, in which the special key has an inclined portion for coaction with, but normally spaced from, a pin on the connection between the general operator and the actuating bar to cam said bar forward when the special key is depressed.

10. In a calculating machine which comprises accumulator wheels, devices for running numbers thereinto, a flexible denominational keyboard for setting up the numbers on said devices, and a general operator for all said devices: a set of release keys, one for each denomination of the keyboard, each of said keys constituting the zero stop key; a bar common to all the release keys to actuate them simultaneously; a pivoted lever; a member connected at opposite ends to said lever and said bar; and an arm on the general operator to trip said lever and thereby actuate said member and bar.

11. In a calculating machine, a set of number wheels; a driving rack for each wheel; a set of carrier frames, one for each wheel, each frame having an upper counting rack and a lower transfer rack arranged on one face in spaced relation; a pinion interposed between each pair of spaced racks; a direct connection between each pinion and a driving rack to actuate the related number wheel; yielding actuating means for imparting a translation movement to each pinion to shift the respective counting rack; and indexing keys for determining the extent to which the counting racks and, hence, the driving racks are shifted.

12. A calculating machine, according to claim 11, additionally comprising a shaft, a set of arms thereon, one for each pinion, and means for driving said shaft; and in which the yielding means for imparting translation movements to the pinions comprises a set of links each connected at one end to the respective pinion and having a lost-motion connection at the other end with the corresponding arm on the shaft.

13. A calculating machine, according to claim 11, additionally comprising a main shaft, an auxiliary shaft driven thereby, a set of arms on each shaft, one arm for each pinion, and a rocking carrier for each number wheel, each carrier pivotally connected to one of the arms on the main shaft to be rocked thereby so as to uncouple and couple the number wheels with and from the driving racks; and in which the yielding means for imparting translation movements to the pinions comprises a set of links each connected at one end to the respective pinion and having a lost-motion connection at the other end with the corresponding arm on the auxiliary shaft.

14. In a calculating machine, the combination of number wheels, operating mechanism for each of said wheels comprising an upper normally-movable counting rack and a lower normally-stationary transfer rack, a carrier frame having both racks mounted on one face thereof, and a pinion gearing with both racks; means for actuating the pinions; keys acting directly on the upper racks for determining their normal movement; a driving member individual to each number wheel operated from the respective pinion; a catch for each stationary rack; means whereby the catch is released by the movement of the number wheel so that the movable rack may be moved by the pinion to rotate the particular number wheel and transfer an integer from one wheel to another; and means for supporting each normally stationary rack for a predetermined movement when released.

15. In a calculating machine, the combination of number wheels, operating mechanism for each of said wheels comprising a normally-movable counting rack, a normally-stationary transfer rack, and a pinion gearing with both racks; actuating mechanism for the pinions; keys for determining the normal movement of the counting racks; gearing controlled from the racks for operating the number wheels; catches for each stationary rack; and releasing pawls for said catches movable into one position for addition and into another position for subtraction, said pawls effecting the action of the transfer racks for both addition and subtraction.

16. In a calculating machine, a set of accumulator wheels; a set of individual driving racks therefor; an actuating device for each driving rack comprising a counting rack and a transfer rack, and a pinion meshing with the counting and transfer racks; a bank of keys associated with each actuating device to determine the extent of its active stroke; a main operating element; an individual connection between the main operating element and each pinion to actuate the latter from the former and thereby operate the associated counting and transfer racks; and a connection between said main operating element and each accumulator wheel for uncoupling the wheel from its respective rack during movement of the operating element in one direction and coupling the wheel with its rack during movement in the other direction.

In testimony whereof I affix my signature.

WILLIAM BALL.